United States Patent [19]
Fleury et al.

[11] Patent Number: 5,820,903
[45] Date of Patent: Oct. 13, 1998

[54] CALCIUM FORTIFIED YOGURT AND METHODS OF PREPARATION

[75] Inventors: Amy R. Fleury, Arden Hills; Dean F. Funk, Brooklyn Park; Mayank T. Patel, Maple Grove; Warren D. Vala, Plymouth, all of Minn.

[73] Assignee: General Mills, Inc., Minneapolis, Minn.

[21] Appl. No.: 885,435

[22] Filed: Jun. 30, 1997

[51] Int. Cl.⁶ .................................. A23C 9/13; A23L 1/29
[52] U.S. Cl. .................................. 426/74; 426/34; 426/42; 426/43; 426/583; 426/615
[58] Field of Search ............................. 425/74, 583, 34, 425/42, 43, 615

[56] References Cited

U.S. PATENT DOCUMENTS

| | | | |
|---|---|---|---|
| 4,784,871 | 11/1988 | Park | 426/583 |
| 4,797,289 | 1/1989 | Reddy . | |
| 5,186,965 | 2/1993 | Fox et al. . | |
| 5,449,523 | 9/1995 | Hansen et al. . | |
| 5,500,232 | 3/1996 | Keating . | |

*Primary Examiner*—Helen Pratt
*Attorney, Agent, or Firm*—John A. O'Toole; Douglas J. Taylor; Everett G. Diederiks, Jr.

[57] ABSTRACT

Nutritionally improved yogurt products are provided that include a calcium phosphate salt of reduced particle size. The calcium fortification provides yogurts containing a total calcium content of 500 to 1500 mg per 170 g of yogurt. The calcium phosphate has a particle size of less than 150 μm in the product. A method for producing the calcium fortified yogurt is also provided wherein an insoluble calcium salt is admixed with a yogurt base subsequent to fermentation with minimal shear. The yogurt base is prepared by conventional fermentation to have a thickness of at least 1500 cps (at 5° C.). Separately, a concentrated slurry of a calcium phosphate is prepared having a pH of 4.0 to 4.6. The pH is adjusted by adding an edible organic or mineral acid. The slurry can be subjected to a size reduction step such as homogenization. Sufficient amounts of calcium phosphate slurry are admixed with the yogurt base to provide desired levels of calcium content (native plus supplemental).

31 Claims, 1 Drawing Sheet

CALCIUM FORTIFIED YOGURT AND METHODS OF PREPARATION

FIELD OF THE INVENTION

This invention relates to fermented food products such as yogurt compositions and to their methods of manufacture, and more specifically to yogurt fortified with calcium.

BACKGROUND OF THE INVENTION

Recent medical studies have indicated that a diet containing the U.S. recommended daily allowance (RDA) of calcium may be effective in preventing or mitigating osteoporosis, and also possibly high blood pressure and colon cancer. There is therefore great public interest in the consumption of food products that will supply the recommended daily allowance of calcium.

Nutritionists and consumers alike recognize dairy products as good sources of calcium. Consumers who may be most in need of an adequate calcium intake (e.g., dieters, the pregnant or middle aged women) are target consumers for yogurt products.

An unfortified six ounce (170 g) serving of fruit-flavored low fat yogurt provides only approximately 200 to 250 mg of calcium. The current RDA is 1000 mg. Thus, the natural calcium content of yogurt must be supplemented by fortification with added calcium in order for a single serving of yogurt to provide 100% or even 50% of the current RDA for calcium. This problem is even more severe for yogurt products containing up to about 20% fruit sauce since such fruit materials are low in native calcium content.

Serious practical difficulties have been encountered in incorporating supplemental calcium into dairy products because most calcium salts have very low solubility in milk. Indeed, in milk itself, up to 60 to 70% of the calcium exists as insoluble colloidal calcium phosphate associated with the casein micelles. Added calcium salts, being generally insoluble and not suspended by casein, therefore tend to settle out, frustrating attempts to maintain uniform dispersions during manufacture.

This problem of suspending insoluble calcium salts is compounded by the fact that generally the yogurt base should not be agitated during the incubation period. Thus, in the manufacture of yogurt using vat incubation, the required lack of agitation during incubation causes a substantial portion of the calcium salt to settle to the bottom of the vat. The salt then must be laboriously scraped off the bottom of the vat and blended into the yogurt. In light of these cleaning difficulties, this process is not only impractical using conventional yogurt manufacturing equipment, but also is likely to adversely affect the texture of the product.

The prior art, however, includes a variety of efforts to overcome the substantial problems of calcium fortification of yogurt. One approach to the calcium fortification of yogurt is disclosed in U.S. Pat. No. 5,449,523 (issued on Sep. 12, 1995 to Hansen) entitled "Process For The Manufacture Of A Calcium Fortified Yogurt With Improved Heat Stability." In this method, an expensive soluble source of calcium is employed. Adding to the cost of the '523 patent is that the calcium content of the already expensive material is less than a third of the preferred salt, tricalcium phosphate, used herein. Moreover, the methods employed in the '523 patent require the addition of chelating agents to avoid undesirable milk protein precipitation. Usage of such required chelating, however, can adversely affect the flavor of the product. The chelating source(s) contribute an undesirable flavor to the yogurt at the high levels necessary to fortify to 1000 mg calcium. More importantly, however, the cost of the calcium source is prohibitive for a commercially practical product.

Similarly, the art includes numerous teachings directed towards forming a highly soluble complex of citric acid, malic acid and calcium. (See, for example, U.S. Pat. No. 5,186,965 entitled "Calcium Citrate Malate Composition"). While useful, such formulations require addition of expensive special ingredients or extensive processing to form the materials in situ.

Still another approach is to try to employ inexpensive insoluble calcium materials (see particularly, U.S. Pat. No. 4,784,871 entitled "Method For Producing Calcium Fortified Yogurt," issued Nov. 15, 1988 to Peter H. Park). The '871 patent teaches admixing an acid soluble salt optionally with sugar with an essential acidic fruit blend. The acidic fruit blend is allowed to dissolve a portion of the calcium salt. About 5 to 45% of the product of the fortified fruit blend with the partially dissolved calcium is then admixed with a fermented yogurt base to prepare a calcium fortified fruit containing yogurt product. Sugar is added to the fruit to assist in the avoidance of lumping of the calcium phosphate salt. Thus, the invention relies upon the fruit to solvate a portion and to suspend the balance of the insoluble calcium within the yogurt product.

While useful, not all yogurt flavors popular today contain fruit. Thus, it would be desirable, to be able to provide a calcium fortified yogurt that did not require the presence of a fruit ingredient. Moreover, it would be desirable to provide a reduced calorie yogurt fortified with calcium that did not require sucrose. Thus, the present invention can be viewed as an improvement upon the product and methods of the '871 patent.

In view of the state of the art, there is a continuing need for new and improved yogurt products, particularly those providing enhanced nutritional benefits.

Accordingly, it is an objective of the present invention to provide new nutritionally improved yogurt products and their methods of preparation. A further objective is to provide new and effective methods for calcium fortification of fermented dairy products such as yogurt.

Another objective is to provide methods for preparing calcium fortified yogurts that minimize milk protein precipitation.

Still another objective is to provide methods for calcium fortification that do not require usage of expensive calcium materials.

Another objective of the present invention is to provide new methods for preparing calcium supplemented yogurts fortified with inexpensive calcium materials.

Another objective is to provide improved calcium fortified yogurt products that exhibit both good taste and good texture.

Surprisingly, the above objectives can be obtained and improved calcium fortified yogurt products can be provided. The present invention resides, in part, in the discovery that by providing insoluble calcium salts, of a particular particle size, that improved organoleptically acceptable calcium fortified products can be obtained that do not require a fruit ingredient.

SUMMARY OF THE INVENTION

In its product aspect, the present invention is directed towards fermented dairy products such as yogurt comprising a fermented dairy product base having a viscosity of at least 1500 cps (at 5° C.) and a calcium phosphate salt in a quantity sufficient to bring total calcium content of the composition to from about 500 to 1300 mg per 170 g serving (0.29 to 0.76% by weight).

The calcium amounts include both the native level supplied by the milk source as well as the supplemental added calcium.

The calcium salt is selected from the group consisting of tricalcium phosphate, dicalcium phosphate, and their hydrates, and mixtures thereof.

The calcium phosphate has a particle size of less than 150 microns.

In its process aspect, the present invention resides in methods of preparing a fermented dairy product fortified with calcium that is undetectable in the final product visually. The process involves the post fermentation addition of a source of insoluble calcium. The calcium phosphate has a particle size of less than 150 microns. The methods comprise the steps of A) providing a fermented dairy product having a viscosity of at least 1500 centipoise (at 5° C.) and, B) adding with minimal shear, sufficient amounts of calcium phosphate of the requisite particle size to provide a total calcium content of a maximum of 1500 mg of calcium per 227 g of product. The calcium phosphate salt is admixed with a liquid carrier to form a slurry comprising about 30 to 40% calcium phosphate.

DETAILED DESCRIPTION OF THE INVENTION

Figure 1:
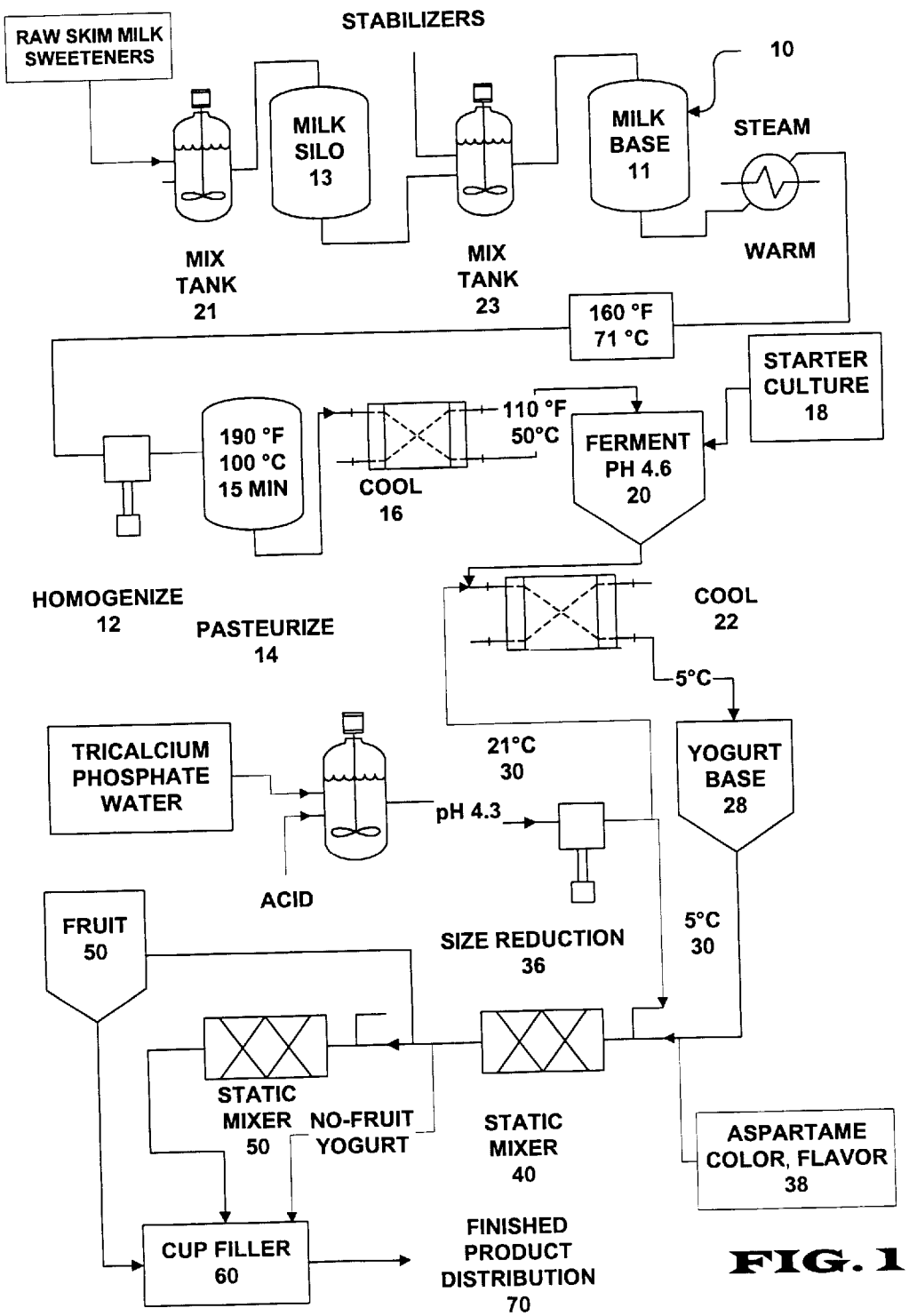
FIG. 1 is a highly schematic process flow diagram illustrating the method of preparation of the present invention.

The present invention relates to improved calcium fortified fermented dairy products containing pulverant insoluble calcium and to their methods of preparation. Each of these product components as well as product use and attributes and preparation steps are described in detail below.

Throughout the specification and claims, percentages are by weight and temperatures in degrees Centigrade unless otherwise indicated.

Providing a Fermented Dairy Base

Referring now to the drawing, it can be seen that in the present methods generally designated by reference numeral 10, the first essential step is to provide a fermented dairy base such as a yogurt. Conventional methods and techniques can be used to practice this step.

Conveniently, this first step can include the substeps of (1) providing a milk base 11, (2) homogenizing the milk base 12, (3) pasteurizing the homogenized milk base 14, (4) bringing the pasteurized milk base to fermenting temperatures 16 such as by cooling, (5) adding a starter culture 18, and (6) fermenting to desired acidities 20.

Briefly, the process typically begins with raw milk, that may contain a combination of whole milk, skim milk, condensed milk, dry milk (dry milk solids non-fat or, equivalently, "MSNF"), grade A whey, cream and/or such other milk fraction ingredients as buttermilk, whey, lactose, lactalbumins, lactoglobulins, or whey modified by partial or complete removal of lactose and/or minerals, other dairy ingredients to increase the nonfat solids content, which are blended to provide the desired fat and solids content. While not preferred, the milk base can include a filled milk component, i.e., a milk ingredient having a portion supplied by a non-milk ingredient, e.g., oil or soybean milk.

While in the present invention, particular emphasis is directed towards fermented bovine milk products such as yogurt, the skilled artisan will appreciate that the present invention is also suitable for use in a wide variety of thickened dairy products, particularly fermented dairy products such as kefir, sour cream and the like.

Also, while bovine milk is preferred, other milks can be used in substitution for bovine milk whether in whole or in part, e.g., goat, sheep or equine milk.

Conveniently, the raw milk and sweeteners (such as fructose, corn syrup, sucrose) can be blended in a first mix tank 21 and stored in a milk silo 13. Stabilizers and thickeners such as starch, gelatin, pectin, agar and carrageenan may also be added if desired. The minor dry ingredients are combined with the sweetened milk to form the milk base 11 conveniently in a separate mixing vessel 23.

Next, the milk base 11 is homogenized 12 in a conventional homogenizer to disperse evenly the added materials and the fat component supplied by various ingredients thereby forming an homogenized milk base. If desired, the milk base 11 can be warmed prior to homogenization from typical milk storage temperatures of about 5° C. to temperatures of about 65° to 75° C.

This homogenized milk base is then pasteurized 14, typically by heating for times and temperatures effective to accomplish pasteurization to form a pasteurized milk base. As is well known, the milk base 11 can be heated to lower temperatures for extended times, e.g., 88° C. for 30 minutes, or alternately to higher temperatures, e.g., 95° C., for shorter times, e.g., for about 38 seconds. Of course, intermediate temperatures for intermediate times can also be employed. Other pasteurization techniques can be practiced (e.g., light pulse, ultra high pressure, etc.) if effective and economical. In certain commercial practices, the sequence of the homogenization and pasteurization steps can be reversed.

The homogenized and pasteurized base is then brought to incubation temperature, usually about 40 to 46° C. When heat pasteurization is employed, this step typically is a cooling step 16.

Thereafter, the homogenized and pasteurized milk blend is inoculated with a desired culture 18. Usually, a combination of lactobacillus bulgaricus and streptococcus thermophilus bacteria is added to begin the fermentation process. The fermentation step 20, is quiescently continued until the pH of the milk blend reaches approximately 4.4 to 4.6 to form the yogurt base. Depending upon temperature and amount of culture added, this may take from about three to about 14 hours. It is important that the mixture not be agitated during the fermentation process to allow proper curd formation. When the proper pH has been reached, the yogurt is cooled 22 (e.g., to about 2° to 21° C.) to arrest further growth and any further drop in the pH.

The particular fermentation endpoint pH can vary modestly. Typically, the endpoint pH can range from about 4.2 to 4.6, preferably about 4.45 to 4.55.

The yogurt base 28 thus prepared importantly is characterized by a viscosity of at least 1500, preferably at least 2300 cps (at 5° C.). Such a viscosity is important to suspending the insoluble calcium salt. At a viscosity of 1500 cps, the yogurt is a thinner substance useful for a yogurt beverage-type product. Yogurt viscosities can range up to 25000 cps.

The skilled artisan will appreciate that the calcium fortification methods herein rely upon post fermentation rather than prefermentation addition. By avoiding prefermentation addition, the various problems associated therewith can be avoided. Thus, calcium precipitation during fermentation is avoided. Similarly, various adverse problem interactions can be minimized such as with the milk protein.

While the above described particular process can be used, any vat set fermented yogurt can be used.

Moreover, although a live yogurt product is preferred, the present invention can also be used in yogurt-based foods as distinguished from a yogurt product. For example, a shelf stable yogurt-based product is prepared by heat treating a yogurt to inactivate the culture and packaging aseptically (not shown). In this variation, the pH of the yogurt based product can be adjusted for taste or for compatibility with other ingredients. For example, the pH can be adjusted upwards substantially for a chocolate flavored yogurt based product.

Adding Calcium Salt

Thereafter, the present methods essentially further comprise the step of adding an insoluble calcium salt 30 of defined particle size into a yogurt base without substantial shear in an amount effective to provide the desired calcium enrichment.

The particular degree of calcium content and fortification can be expressed in several different ways. Most broadly, sufficient amounts of calcium salt is added to provide a total (native plus supplemental) calcium content of about 0.25 to 0.76% by weight. Such a level provides about 425 to 1300 mg of total calcium per 170 g (6 oz) serving and about 565 to 1725 mg of total calcium in a 227 g (8 oz) serving. Preferred for use herein are yogurts fortified with calcium providing about 500 to 1300 mg per serving whether from the six or eight ounce serving. Most preferred are yogurts providing about 500 to 1200 mg calcium per serving (6 to 8 oz), that is, a yogurt providing 50 to 100% of the current recommended daily allowance for calcium.

Useful herein as the source of supplemental calcium is calcium phosphate. Calcium phosphate is generally available as a mono basic ($CaH_4(PO_4)_2 \cdot H_2O$), di-basic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)_2 \cdot Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while the present calcium phosphate salts are characterized herein as insoluble, of course, some small percentage will dissolve in water depending in part upon the temperature and pH. However, at the concentrations of calcium salt used both in the slurry and the yogurt products herein, the great percentage is in a solid state.

Unfortunately, other calcium salts that might otherwise be thought as useful but cannot be employed for one reason or another include, calcium ascorbate (too expensive), calcium citrate (creates a chalky product and imparts a bad after taste), calcium carbonate (too effervescent and imparts a bad off-flavor), calcium gluconate (too expensive), calcium lactate (too expensive and bad flavor), and calcium sulfate (too strongly flavored).

The calcium phosphate is mixed with water to form a slurry. Generally, the slurry can comprise about 20 to 50% calcium phosphate, preferably 25 to 40% and about 50 to 75% water, preferably about 60 to 70%.

The present calcium phosphate materials are highly alkaline, especially when dispersed in water. In order to avoid raising the pH of the yogurt when the calcium phosphate is admixed, it is desirable to "acidify" the calcium phosphate slurry. That is, the pH is brought to the approximate acidity of the yogurt being fortified by addition of an acid. It is also important to avoid over acidifying the calcium phosphate. Thus, the pH should be within a few tenths of a pH of the yogurt.

Since the pH of the yogurt generally will range from about 4.4 to 4.6, good results are generally obtained when the aqueous slurry pH ranges from about 4.0 to 4.6, preferably about 4.4 to 4.6. The preferred pH of the calcium aqueous slurry is at the pH of the yogurt or below.

The slurry pH is adjusted to particular values within the above range by addition of an acid or acidulant. Useful herein as the acidulant is adipic, citric acid, fumaric, malic acid, and mixtures thereof. Preferred for use herein as an acidulant is citric acid.

Most importantly, the calcium phosphate has a particle size in the slurry and, therefore, in the finished product of less than 150 microns("$\mu$m"). Having a calcium phosphate being of sufficiently reduced particle size is important to maintaining the calcium in suspension in the finished yogurt for extended times and to avoiding a "grittiness" organoleptic attribute in the finished yogurt. Preferably, the calcium phosphate has a particle size of less than 65 $\mu$m and for best results less than 11 $\mu$m.

Of course, the calcium phosphate material will have a particle size distribution curve. Surprisingly, if a significant amount of the calcium phosphate (i.e., >10%) is larger than about 150 microns, then the calcium phosphate begins to become perceptible as imparting an undesirably "chalky" mouth feel. For the very best product, preferred herein are yogurt finished products wherein the calcium phosphate particle size is such that the mean particle size is less than four microns and at least 90% of the calcium phosphate has a particle size of less than about seven microns.

A useful technique for ensuring that the calcium phosphate is of the requisite particle size in small scale production is to screen a calcium phosphate starting material. For example, a maximum of 0.5% on a #140 U.S. standard sieve and a minimum of 95% through a #325 U.S. standard sieve is preferred (wet sieve method).

Another technique especially useful in commercially scaled processes, and preferred for use herein, is to employ a supplemental size reduction step 36 after slurry preparation but prior to admixture with the yogurt base. Suitable supplemental size reduction techniques include, for example, passing the slurry through a colloidal mill, or preferably a two-stage homogenizer followed by passing the slurry through mesh screens/strainers, and using a high speed shear impeller in the blender in which the slurry is prepared. The slurry can be passed through the homogenizer for one, two or even more passes sufficient to provide the essential calcium phosphate particle size feature described herein.

In preferred practice, the slurry makeup includes a supplemental heating step with vigorous agitation to insure hydration and suspension of the insoluble calcium salt. Thereafter, the slurry can be heated to about 73.9° to 87.8° C. (165° to 190° F.). The preferred temperature of the calcium slurry is the same as or below the yogurt upon admixture. Thus, if a heating step is employed, thereafter, the slurry can be cooled to or below the temperature of the yogurt base (2° to 21° C. depending upon whether added to the yogurt base before or after the yogurt base has been cooled) prior to admixture therewith to reduce thermal shock to the yogurt. The heating substep not only aids in dispersion of the calcium but also insures that the slurry is pasteurized prior to admixture with the yogurt base. For example, if the yogurt base is at 5° C., the slurry should be about 2° to 5° C.

In preferred practice, the slurry and yogurt are admixed using minimum shear so as to avoid degrading the yogurt base's viscosity. As illustrated in FIG. 1, an in-line static mixer 40 can be used to blend the slurry into the yogurt base by static mixing to minimize shear.

If desired, the yogurt base cooling and calcium admixing steps can be reversed. In this variation, a warm slurry is added to the still warm yogurt base. The blend is then cooled thereafter to about 5° C.

In certain embodiments, particularly low fat and/or low calorie variations, the yogurt product herein comprises a high potency non-nutritive carbohydrate sweetening agent. Exemplary high potency sweeteners include aspartame, sucrose, potassium acelsufame, saccharin, cyclamates, thaumatin and mixtures thereof. Especially preferred for use herein is aspartame.

If aspartame is employed, an aqueous dispersion 38 thereof can be prepared and added to the yogurt base. The aspartame is preferably added separately from the calcium slurry since aspartame tends to degrade under the processing conditions of the slurry preparation.

The calcium slurry may also contain vitamin D. Vitamin D enhances calcium absorption. It may be added up to 400 I.U. per quart of food "yogurt" per the yogurt standards of identity.

If desired, various flavors can be added with or in a manner similar to the aspartame dispersion. Illustrative flavors include vanilla, chocolate, amaretto cheesecake, white chocolate, Boston cream pie, Café Au Lait, caramel apple, banana cream pie and mixtures thereof.

Optional Ingredients

If desired, the calcium fortified yogurt can additionally include a conventional fruit sauce or puree. If present, the fruit constituent can comprise about 5 to about 15% of the yogurt product. The present method thus can comprise the optional additional step of adding a fruit sauce or puree 50.

In the manufacture of Swiss-style yogurt, a fruit flavoring is blended substantially uniformly throughout the yogurt after fermentation is complete but prior to packaging 50. A second static mixer 54 can be used to blend the fruit sauce into the yogurt with minimal shear.

In the manufacture of "sundae" style yogurt, fruit flavoring is deposited 58 at the bottom of the consumer container, and the container is then filled with the yogurt mixture. To prepare a sundae style yogurt product employing a stirred style yogurt, the milk base is prepared with added thickeners and/or stabilizers to provide upon resting a yogurt texture that mimics a "set" style yogurt. In this variation, the fruit is added directly to the container, typically to the bottom, prior to filling with the yogurt.

The fruit flavoring sauce or puree used in the invention may be any of a variety of conventional fruit flavorings commonly used in yogurt products. Typical flavorings include strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer, natural and/or artificial flavors, colorings, preservatives, water and citric acid or other suitable acid to control the pH. Minor amounts (e.g., providing less than 50 mg of calcium per 226 g serving) of calcium can be added to the fruit to control the desired texture of the fruit preparation typically provided by a soluble calcium material such as calcium chloride.

If aspartame is added to the yogurt base, all or a portion of the aspartame can be pre-blended with the fruit flavoring.

If desired, the milk base can be formulated with thickeners and setting agents that will set up after cup filling that will impart a texture to the yogurt that mimics a set-style type yogurt product.

The products can additionally include a variety of other ingredients to increase their nutritional, organoleptic or other consumer appeal, e.g., fruit pieces, nuts, partially puffed cereals, etc.

The yogurt base can optionally further comprise a nutritive carbohydrate sweetening agent(s). Exemplary useful nutritive carbohydrate sweetening agents include, but are not limited to, sucrose, high fructose corn syrup, dextrose, various DE corn syrups, beet or cane sugar, invert sugar (in paste or syrup form), brown sugar, refiner's syrup, molasses (other than blackstrap), fructose, fructose syrup, maltose, maltose syrup, dried maltose syrup, malt extract, dried malt extract, malt syrup, dried malt syrup, honey, maple sugar, except table syrup and mixtures thereof.

Preferably, the yogurt is unaerated. That is, the yogurt phase(s) can have a density of from about 0.9 to 1.2 g/cc. However, in other variations the yogurt can be aerated to about 0.5 to 0.8 g/cc, especially for soft serve frozen yogurt products.

The calcium fortified yogurt with or without fruit (whether blended with the yogurt base or as a separate phase) is then charged to a conventional container such as a coated paper or plastic cup. After filling, the filled containers are applied with a lid or other closure, assembled into cases and entered into refrigerated storage for distribution and sale.

Description of Finished Product Attributes

The present invention provides both fermented dairy products and methods for addition of a high level of calcium to yogurt products. The resulting yogurt has an acceptable texture and flavor. The present methods conveniently add the calcium in a heat treated, flowable, pumpable stream. The present invention provides calcium fortification of yogurts that do not contain a fruit preparation.

While the invention finds particular suitability for a connection with yogurt, the skilled artisan can appreciate that the invention can also be used in connection with other fermented dairy products such as sour cream and kefir. Also, non-fermented dairy products having the requisite viscosity can be prepared, e.g., starch gels (puddings), frozen desserts, cheeses (e.g., processed cheese). In such products, the particular pH of the slurry can be adjusted to the pH typical of the product to be fortified.

Example 1

A light yogurt fortified to 1000 mg calcium (100% of recommended Daily Value "DV") per 8 oz (227.2 g) serving was prepared as follows:

An aspartame sweetened yogurt containing 8.91% MSNF and 0.1% butterfat was formulated and fermented to a pH of 4.55. A calcium slurry consisting of 27.1% TCP, 1.3% citric acid and 71.6% water was prepared and ambiently cooled to 4.40° C. (40° F.) in a walk-in cooler. The average particle size was about 6 microns and at least 90% had an average particle size of less than 20 microns. The pH of the slurry was about 4.4. This calcium slurry was mixed with a milk can stirrer by hand to thoroughly re-suspend the calcium. The slurry was then added to the warm, fermented, broken yogurt at 4.5% (4.5 lbs of slurry to 95.5 lbs of yogurt) and stirred again by hand. The calcium fortified yogurt was cooled through a plate heat exchanger to 15.5° to 21° C. (60° to 70° F.) . The viscosity was about 2000 cps (at 15.6° C.). A flavored, aspartame containing fruit prep was added to the cooled, fortified yogurt and was mixed in by hand. The finished product was ambiently cooled to 4.40° C. (40° F.) in a walk-in cooler during which the viscosity increased. The mean particle size of the calcium phosphate in the yogurt was 10 microns.

The finished product had a pleasant acceptable flavor and texture and did not have precipitated proteins.

Products of substantially equivalent organoleptic attributes are obtained when the slurry or aspartame additionally comprises supplemental vitamin D.

Example 2

Three sugar-sweetened yogurts fortified to 1000 mg total calcium (100% Recommended Daily Allowance) per 8 oz serving was prepared as follows:

Yogurt containing 10.5% milk solids non-fat ("MSNF") and 0.1% butterfat was formulated, fermented to a pH of 4.55, and cooled through a plate heat exchanger to −1.1° to 4.4° C. (30° to 40° F.). A calcium slurry consisting of 27.1% TCP, 1.3% citric acid and 71.6% water was prepared and heated to 82.2° C. (180° F.) for one minute. The hot slurry was then homogenized for varying lengths of time to yield three subsequent calcium slurries with mean particle diameters of 4, 6, and 7 μm respectively. These slurries were cooled ambiently to 4.4° C. and added to the cooled 4.4° C. yogurt base at 4.5% (4.5 kg of slurry added to 100 kg of yogurt 4.5 lbs of slurry added to 95.5 lbs of yogurt) and stirred by hand. Fruit prep, flavor, and color were mixed into the fortified yogurts by hand. The products had viscosities of about 23000 cps and acceptable flavor, texture, and mouth feel. The weight percent of calcium in the finished product was about 0.44%.

Example 3

An aspartame sweetened or "Light" non-fat yogurt fortified to 600 mg calcium (60% Daily Value or ("DV") per 8 oz serving) was prepared as follows:

Yogurt containing 8.91% milk solids non-fat ("MSNF") and 0.1% butterfat was formulated and fermented to a pH of 4.55.

A calcium slurry consisting of 73.56% water and 26.44% of TCP was prepared. To prepare this slurry, the calcium was added to the 37.7° C. (100° F.) water with agitation. The pH was lowered to 4.4 by the slow addition of citric acid. The calcium slurry was placed in a steam heated water bath, heated to 82.20° C. (180° F.) and held for one minute. The slurry was then ambiently cooled to 4.4° C. (40° F.).

To prepare the calcium fortified yogurt product, the cooled slurry was added to the fermented, warm yogurt base at 2.7%. Cooled, 4.4° C. (40° F.) water that had been previously heat treated was also added to the yogurt base.

The yogurt, calcium slurry, and water were then mixed by hand. The product was cooled to 15.5° to 21° C. (60° to 70° F.) through a plate heat exchanger. Fruit prep containing aspartame and flavoring was then stirred in by hand and the product was further cooled to 4.4° C. (40° F.) by ambient cooling in a walk-in cooler. The mean particle size of the calcium phosphate was about 10 μm.

Example 4

An aspartame sweetened or "Light" non-fat yogurt fortified to 1400 mg calcium (140% DV) per 8 oz serving was prepared as follows:

An aspartame sweetened non-fat yogurt containing 8.91% MSNF and 0.1% butterfat was formulated and fermented to a pH of 4.55. A calcium slurry consisting of 39% TCP, 1.87% citric acid and 59.13% water was prepared as described in Example 1 and ambiently cooled to 4.4° C. (40° F.). This calcium slurry was mixed with a milk can stirrer by hand to thoroughly re-suspend the calcium. The slurry was then added to the warm, fermented, broken yogurt at 4.5% and stirred again by hand. The calcium fortified yogurt was cooled through a plate heat exchanger to 15.5° to 21° C. (60° to 70° F.). About 13% of a flavored, aspartame containing fruit prep was added to the cooled, fortified yogurt and was mixed in by hand. The product was allowed to ambiently cool to 4.4° C. (40°)F.

Example 5

A yogurt fortified to 1200 mg calcium (120% DV) per 8 oz serving was prepared as follows:

Yogurt containing 8.91% MSNF and 0.1% butterfat was formulated and fermented to a pH of 4.55. A calcium slurry consisting of 32% TCP, 1.54% citric acid and 66.46% water was prepared and ambiently cooled to 4.4° C. (40° F.). This calcium slurry was mixed with a milk can stirrer by hand to thoroughly re-suspend the calcium. The slurry was then added to the warm, fermented, broken yogurt at 4.5% and stirred again by hand. The fortified yogurt was cooled through a plate heat exchanger to 15.5to 21° (60° to 70° F.). A flavored, aspartame containing fruit prep was added to the cooled, fortified yogurt and was mixed in by hand. The product was allowed to ambiently cool to 4.4° C. (40° F.) in a walk-in cooler. The mean particle size of the calcium phosphate was about 10 microns.

What is claimed is:

1. method of producing a fermented dairy product fortified with a calcium salt, comprising the steps of:
    A. providing a fermented dairy product in the form of a non-fruit yogurt base having a viscosity of at least 1500 centipoise (at 5° C.) and,
    B. adding with minimal shear a non-fruit blended calcium phosphate salt into the yogurt base, in an amount effective to provide a total calcium content of up to 1500 mg per 170 g serving to form a calcium enriched fermented dairy product, said calcium phosphate salt having a particle size of less than 150 microns.

2. The method of claim 1 wherein the calcium source is selected from the group consisting of tricalcium phosphate, dicalcium phosphate, their hydrates, and mixtures thereof.

3. The method of claim 2 wherein the fermented dairy product is a yogurt having a viscosity of at least 2300 cps (at 5° C.).

4. The product produced by the method of claim 3.

5. method of claim 2 wherein the calcium salt addition includes the substeps of forming a slurry comprising:
    about 30 to 40% calcium phosphate, about 60 to 70% water, and sufficient amounts of edible acid to provide a pH of about 4.2 to 4.6, wherein the particle size of the calcium phosphate is less than 150 µm, and admixing the slurry with the yogurt base without shear.

6. The method of claim 5 additionally comprising the step prior to admixing of subjecting the slurry to a size reduction step sufficient to reduce the mean particle size of the calcium salt to <11 µm.

7. The product produced by the method of claim 6.

8. The method of claim 1 further comprising subsequently adding a fruit ingredient of about 5 to 15% by weight of the fermented dairy product.

9. The product produced by the method of claim 8.

10. The method of claim 1 wherein the fermented dairy product is a yogurt and wherein the yogurt is free of a fruit ingredient.

11. The product produced by the method of claim 1.

12. A fermented dairy product fortified with calcium comprising:

A. a quantity of fermented dairy product in the form of a non-fruit yogurt base having a viscosity of at least 1500 cps (at 5° C.), and B. sufficient amounts of non-fruit blended calcium phosphate, dispersed in the yogurt to provide at least 251 mg of calcium per 170 g (up to 1500 mg calcium per 170 g) wherein the particle size of the calcium phosphate is less than 150 µm.

13. The fermented dairy product of claim 12 wherein the calcium phosphate is calcium phosphate tribasic.

14. The fermented dairy product of claim 13 wherein the calcium phosphate has a particle size of less than 65 µm.

15. The fermented dairy product of claim 14 wherein the dairy product is free of a fruit ingredient.

16. The fermented dairy product of claim 14 wherein the total calcium content is about 0.29 to 0.76% by weight.

17. The fermented diary product of claim 16 wherein the calcium phosphate is evenly dispersed throughout the product.

18. The fermented food product of claim 17 additionally comprising a fruit constituent in the amount of about 5 to about 15% of the product, said fruit constituent being a fruit sauce and contributing less than 50 mg calcium.

19. The fermented dairy product of claim 17 wherein the pH of the product is about 4.4 to 4.6.

20. The fermented dairy product of claim 14 additionally comprising a high potency sweetener.

21. In a method of producing a fermented dairy product fortified with a calcium phosphate salt by the post fermentation addition of a non-fruit blended calcium phosphate slurry having a pH of 4.1 to 4.7, said slurry comprising calcium phosphate, water and an edible acid, the improvement comprising:

wherein the calcium phosphate is in particulate form and has a particle size of less than 150 µm.

22. The method of claim 21 wherein the fermented dairy product is yogurt.

23. The method of claim 22 wherein the yogurt includes a live culture and has a viscosity of at least 2300 cps (at 5° C.).

24. The method of claim 23 wherein the yogurt is free of a fruit ingredient.

25. The method of claim 23 additionally comprising the step of forming the yogurt into an aerated soft-frozen yogurt product having a density of 0.5 to 0.8 g/cc and a temperature of −5° to −8° C.

26. The method of claim 23 wherein the calcium phosphate is tricalcium phosphate having a mean particle size of <11 µm.

27. The product prepared by the method of claim 26.

28. The method of claim 26 wherein the improvement additionally includes the step of subjecting the slurry to a size reduction step.

29. The method of claim 26 wherein the slurry is admixed with a yogurt base with minimal shear.

30. The method of claim 29 wherein the slurry size reduction step includes homogenizing the slurry.

31. The product prepared by the method of claim 21.

* * * * *